United States Patent [19]

Rightmyer

[11] Patent Number: 5,028,307

[45] Date of Patent: Jul. 2, 1991

[54] APPARATUS FOR GENERATION OF HYDROGEN AND OTHER GASES FROM THE DECOMPOSITION OF ORGANIC MATTER

[76] Inventor: Donald A. Rightmyer, 141 N. Ellsworth Apt. 203, San Mateo, Calif. 94401

[21] Appl. No.: 456,463

[22] Filed: Dec. 26, 1989

[51] Int. Cl.$^5$ .............................................. C25B 9/00
[52] U.S. Cl. .................................... 204/278; 204/275
[58] Field of Search ............... 204/242, 278, 131, 129, 204/275, 266; 423/352, 580, 359, 351

[56] References Cited

U.S. PATENT DOCUMENTS

| | | | |
|---|---|---|---|
| 4,124,694 | 11/1978 | Whelan | 423/580 |
| 4,172,885 | 10/1979 | Perry | 423/359 |
| 4,369,102 | 1/1983 | Galluzzo et al. | 204/129 |
| 4,395,316 | 7/1983 | St. John | 204/129 |
| 4,506,631 | 3/1985 | Phong-Anant | 204/129 |
| 4,752,364 | 6/1988 | Dhooge | 204/131 |

FOREIGN PATENT DOCUMENTS 0117333 7/1918 United Kingdom ............... 423/351

OTHER PUBLICATIONS

Grant and Hack's; *Chemical Dictionary*, Ammonia; p. 32, 5th Edition, 1987.
Durrant and Durrant; *Introduction to Advanced Inorganic Chemistry*; Ammonia; p. 708; 1970; Second Edition.

Primary Examiner—John F. Niebling
Assistant Examiner—Kathryn Gorgos
Attorney, Agent, or Firm—Thomas M. Freiburger

[57] ABSTRACT

An apparatus and method are disclosed for electrolysis of organic cellulose material to produce free hydrogen. Ground vegetation is saturated with liquid ammonium hydroxide to produce a mixture. The mixture is preferably fed through a tubular device using a screw feed mechanism or other appropriate feed mechanism, past cathodes and anodes which are positioned at intervals and in opposition in walls of the tubular device. Electrolysis is conducted on the mash and free hydrogen is collected at the cathodes via a tube connection adjacent to each cathode. Oxygen is also produced and collected. The hydrogen may be purified by utilizing a hydrogen scrubber which uses liquid nitrogen to condense and remove any contaminating gases. The collected hydrogen may be reacted with nitrogen and oxygen to replenish the ammonia for input to the process. It may also be reacted with oxygen to produce water, or it may be used for other purposes such as for fuel.

6 Claims, 4 Drawing Sheets

APPARATUS FOR GENERATION OF HYDROGEN AND OTHER GASES FROM THE DECOMPOSITION OF ORGANIC MATTER

BACKGROUND OF THE INVENTION

This invention relates to an apparatus for generating hydrogen and other gases from the decomposition of organic cellulose matter. The invention provides means for rapidly decomposing organic cellulose materials which may include grass, weeds, leaves, paper, cardboard, sawdust and other organic materials. Means are provided for processing these organic materials such that they may be subjected to electrolysis. The invention also provides means for capturing the hydrogen and other gases released by the organic material during electrolysis. The hydrogen may then be used in accordance with the invention to produce water and ammonium hydroxide, while the other gases may be used to produce other useful products and substances.

The primary objects of the invention are to create a new source of water, to lessen the escape of harmful gases into the atmosphere and to provide a method, system and apparatus for recycling waste material. The impetus of the invention lies in a number of environmental problems which presently pose a great threat to the world's environment. Inadequate sources of water, environmental pollution and the occurrence of the "greenhouse effect" have lasting and far-reaching consequences. Due to drought conditions, increasing population growth and contamination, current water resources are no longer able to meet the increasing demand of the world's population. The ever-increasing rate of the production of waste material has overburdened and rendered obsolete the available methods of disposal; current methods of disposal use precious resources while contributing to environmental pollution. Carbon dioxide released into the atmosphere has become the primary cause of the "greenhouse effect" which severely threatens the world's climate.

The present invention is intended to partially alleviate these problems by providing an efficient device which decomposes waste organic material, generates hydrogen from this organic material for the production of water or for fuel or other uses, and lessens the discharge of carbon dioxide into the atmosphere.

SUMMARY OF THE INVENTION

In accordance with the present invention, means are provided for achieving high rates of electrolysis of organic material by saturating this material with ammonium hydroxide to form a mash. Ammonium hydroxide is a hydrogen acceptor base that allows hydrogen atoms to be pulled away from the organic cellulose material. Once the hydrogen atoms are released from the cellulose material, they are attracted to an electrode during electrolysis where they form small hydrogen bubbles that are free to rise to the surface of the mash.

The present invention includes an extractor device which promotes decomposition and extracts hydrogen and other gases through electrolysis. The extractor device comprises a preferably tubular housing which receives the organic material during the decomposition process. Electrodes are provided on opposite sides of the tubular housing for initiating electrolysis within the housing chamber. The electrodes are equally spaced along the sides of the housing chamber. Vents are provided, preferably surrounding and coaxial with the electrodes for collecting the gases generated by electrolysis.

The extractor device includes a material feed mechanism which may be a screw feed mechanism in the interior of the housing, for moving the organic material through the extracting chamber. The screw feed mechanism rotates around its longitudinal axis thereby advancing the organic material. Openings at each end are provided for receiving the input organic material and for allowing the material to exit the housing.

An electronic pulsating device preferably is connected to supply a pulsating voltage to the electrodes. The electronic pulsating device pulses in DC voltage through the electrodes for "conditioning" the electrodes while initiating electrolysis. By "conditioning" the electrodes, the electronic pulsating device prevents carbon, in particular, from building up on the electrodes and decreasing their efficiency.

Magnets may be placed between electrodes, starting with a magnet in front of the first set of electrodes. Each magnet is situated such that its north polar face is directed toward the south polar face of each succeeding magnet, in accordance with the teaching of Hasebe U.S. Pat. No. 4,747,925. This arrangement is intended to permit continuous gas flow from the electrodes by enabling small bubbles with correspondingly small buoyancy to be quickly separated from the surface of the electrodes.

It is therefore among the objects of the present invention to provide an inexpensive source of hydrogen gas, to enable efficient decomposition of organic cellulose materials and to lessen the escape of carbon dioxide to the atmosphere due to organic decomposition and the burning of hydrocarbon fuels. Other objects, advantages and features of the invention will be apparent from the following description of preferred embodiments, considered along with the accompanying drawings.

DESCRIPTION OF PREFERRED EMBODIMENTS

Figure 1:
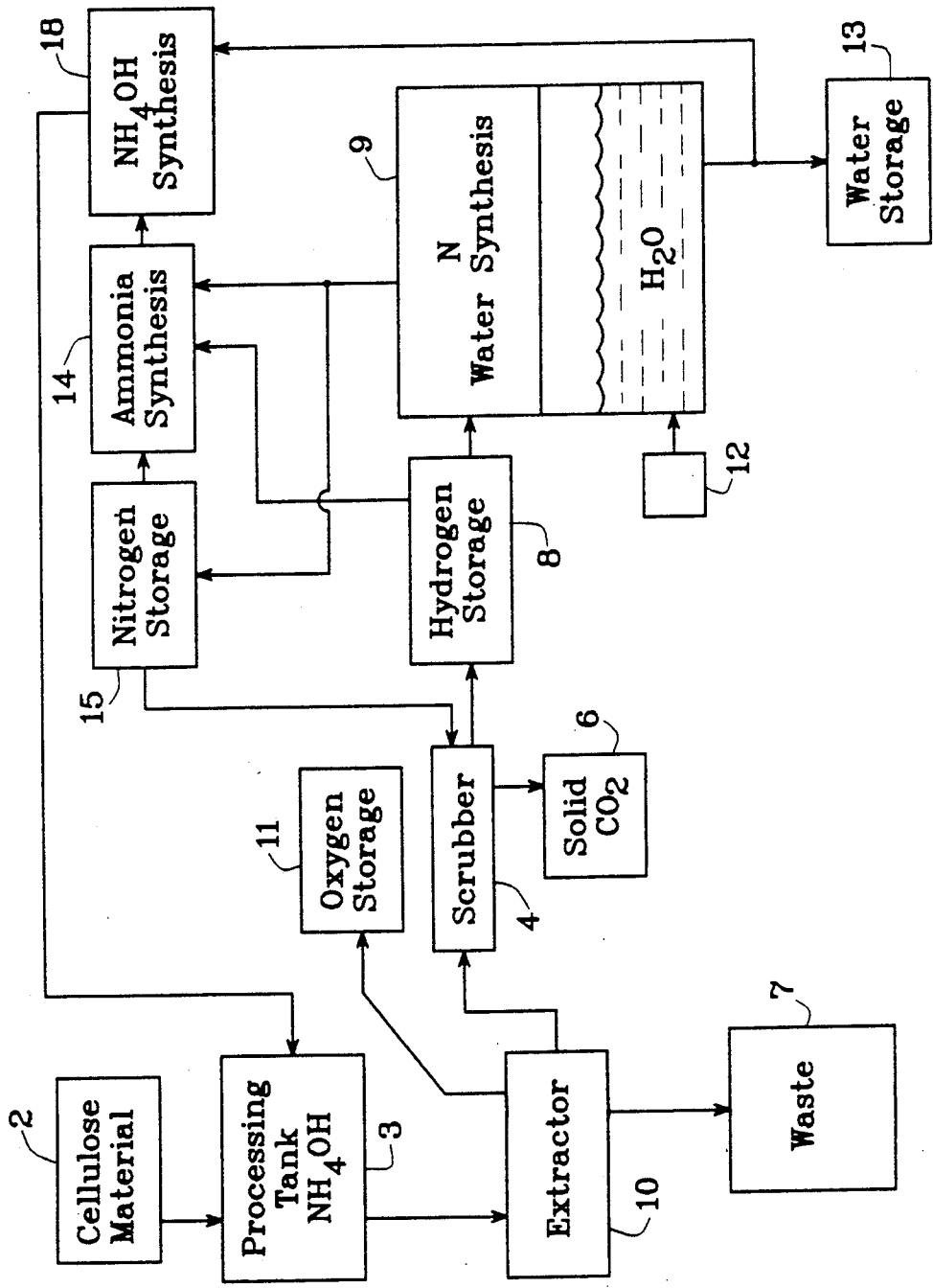
FIG. 1 is a simplified schematic block diagram representation of an overall system in accordance with the invention.

As seen in FIG. 1, the overall process of the present invention includes first collecting and grinding organic cellulose materials 2. This raw material may consist of any of a number of substances such as grass, weeds, leaves, wood pulp, paper, sawdust or cardboard. Once the material is collected, it is ground to a consistency suitable for processing in the apparatus of the invention. Finely ground material is advantageous to the present invention because it allows faster rates of saturation and electrolysis.

Once the cellulose organic material is collected, it is saturated with ammonium hydroxide in a processing tank 3. Cellulose and cellulose-like materials have a chemical formulation of $C_6H_{10}O_5$. This formulation is basically a straight chain link molecular formation in a B(1-4) alignment. As a result, the hydrogen molecules are bonded to the carbon in such a way as to form a solid framework. Because there is a strong electronegativity factor, cellulose is generally unsuitable for regular electrolysis reactions.

Since regular electrolysis of unprocessed cellulose is not possible, the present invention provides a new method of achieving the desired result. The principles of this procedure are similar to those of methods used in wood shaping projects. When wood is saturated with ammonium hydroxide, a hydrogen acceptor base, the hydrogen molecules are pulled away from the tight carbon bonding. This allows the wood to become pliable and to be bent or twisted into any shape desired. When the ammonium hydroxide evaporates, the hydrogen resumes its position in the carbon bond, and the wood permanently retains its new shape.

Even though ammonium hydroxide is a weak base, it provides a good electrolysis medium. By saturating cellulose materials in ammonium hydroxide and then applying the electrolysis device to the resulting material, the hydrogen molecules can be drawn through the ammonium hydroxide to the cathode. Since ammonium hydroxide is a hydrogen acceptor compound, it tends to act somewhat as a tunnel through which the hydrogen molecules can travel until the cellulose is left virtually hydrogen-free. The rule for this action is that for every mole of $NH_4OH$ one hydrogen mole will be accepted.

Once the organic cellulose material and the ammonium hydroxide have had sufficient time to allow complete saturation, an organic mash is formed. The mixture or mash is then introduced into an extractor device 10.

The extractor device 10 performs electrolysis on the saturated cellulose organic material to obtain hydrogen. The specific details and methods of operation of the extractor device will be discussed after a description of the surrounding system.

Hydrogen produced by the extractor device 10 is collected and directed to a hydrogen scrubber 4. As a byproduct of the electrolysis procedure, oxygen, carbon dioxide and a number of other gases are produced, some of which may contaminate the hydrogen. To purify the hydrogen, the hydrogen scrubber 4 preferably uses liquid nitrogen to cool the collected gas and condense and remove any contaminating gases. Carbon dioxide accompanying the hydrogen will be condensed to dry ice and collected in a dry ice collector 6. The purified hydrogen is collected in a hydrogen collector tank 8. The oxygen produced by the extractor device 10 is collected in an oxygen storage tank 11.

As indicated in FIG. 1, organic cellulose material which has been fed through the extractor device 10 is expelled as waste and deposited in a waste chamber 7. This waste, unlike the residues of many other processes for breaking down cellulose, contains no hydrocarbons. The waste may be used as a soil regenerating compound or soil conditioner.

The hydrogen stored in the hydrogen container 8 may, if desired, be routed to water synthesizer 9. The water synthesizer 9 produces water by reacting hydrogen with oxygen. It may use oxygen derived from the atmosphere and introduced by an air compressor 12. Water produced by the water synthesizer 9 may be stored in a water tank 13.

When the hydrogen reacts with the oxygen resident in the compressed atmospheric air, a significant amount of nitrogen is left within the water synthesizer 9. This nitrogen may be collected and routed to an ammonia synthesizer 14. The ammonia synthesizer 14 reacts the nitrogen with additional hydrogen from the hydrogen storage tank 8 to form ammonia. The nitrogen from the water synthesizer 9 may also be compressed to a liquid state and stored in a liquid nitrogen storage tank 15. Liquid nitrogen from the liquid nitrogen storage tank 15 may be routed to the hydrogen scrubber 4 or to the ammonia synthesizer 14.

Ammonia from the ammonia synthesizer 14 may be routed to an ammonium hydroxide synthesizer 18 to be reacted with water to form ammonium hydroxide. As indicated, the ammonium hydroxide synthesizer 18 may use the water synthesizer 9 as its source of water. The resulting ammonium hydroxide may be used to saturate the cellulose organic material in the processing tank 3.

It should be understood that the gases drawn from the extractor 10 will be drawn by appropriate compressors (not shown), with pressure regulation as needed, en route to the hydrogen storage tank 8 and the oxygen storage tank 11. In particular, the heavier-than-air gases oxygen and carbon dioxide can be drawn with very light negative pressure from the extractor 10.

The extractor device 10 and a preferred method of its operation will not be described in detail.

Figure 2:
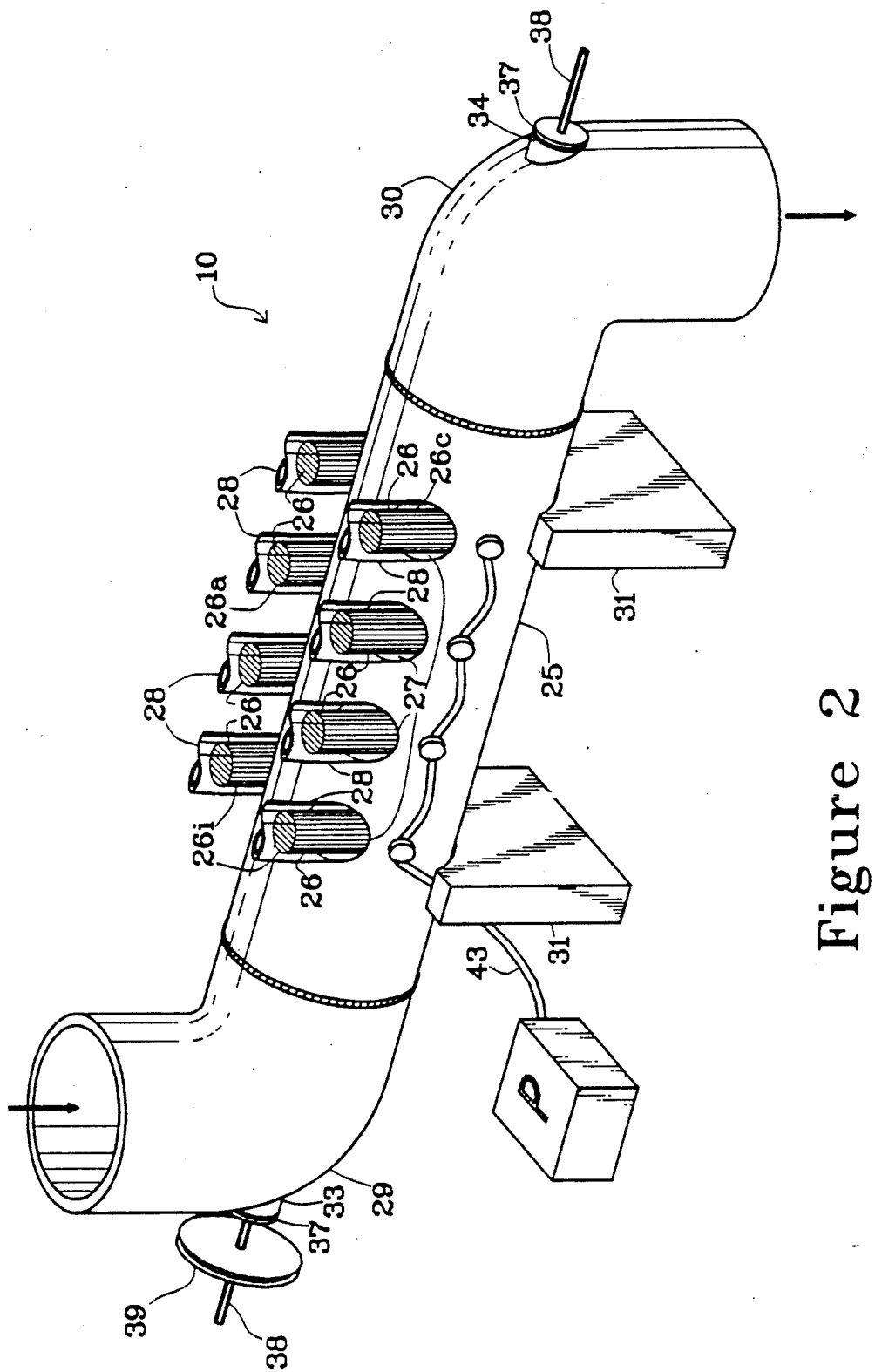
FIG. 2 is a side elevation view, partly in perspective, of an extractor device of the invention.

As seen in FIG. 2, the extractor device 10 comprises a tube-like housing 25 whose diameter and length will be determined by the amount of mash or process mixture that is desired to be processed at any given time. Electrodes 26 are built into each side of the tubular housing as shown, in spaced parallel relationship. Each electrode 26 protrudes through a corresponding opening 27 in the top of the housing. A first pair of opposed electrodes 26i are located near the inlet end of the housing, while each of the subsequent electrodes are set preferably at an equidistant position along the sides of the housing. Although four anodes and four cathodes are used in the configuration of the present invention, the number may be varied to achieve greater results or for different diameters and lengths of housings. Similarly, the configuration of the electrodes may be changed to enhance the operation of the device of the invention.

Collector tubes 28 are fastened over the openings 27 such that gases produced by the extractor device 1 may be collected. The collector tubes in line with the cathodes 26c on one side of the housing lead to the hydrogen scrubber for purifying the hydrogen collected there while the collector tubes in line with the anodes 26a on the opposite side of the housing lead to the oxygen container 11 for collecting oxygen. The extractor device 10 also includes an upward facing inlet elbow 29 and a downward facing outlet elbow 30. The upward facing elbow 29 is adapted to receive the pre-processed mash while the downward facing elbow 30 is adapted to provide an exit for the electrolyzed waste material to leave the extractor device 10. Support members 31 provide a rigid platform for the extractor device 10. The supports 31 may be fastened to a larger support structure (not shown) or they may be left free so that the extractor device 10 may be moved to different operating locations. The arrangement shown in FIG. 2 is for exemplary purposes.

Figure 3:
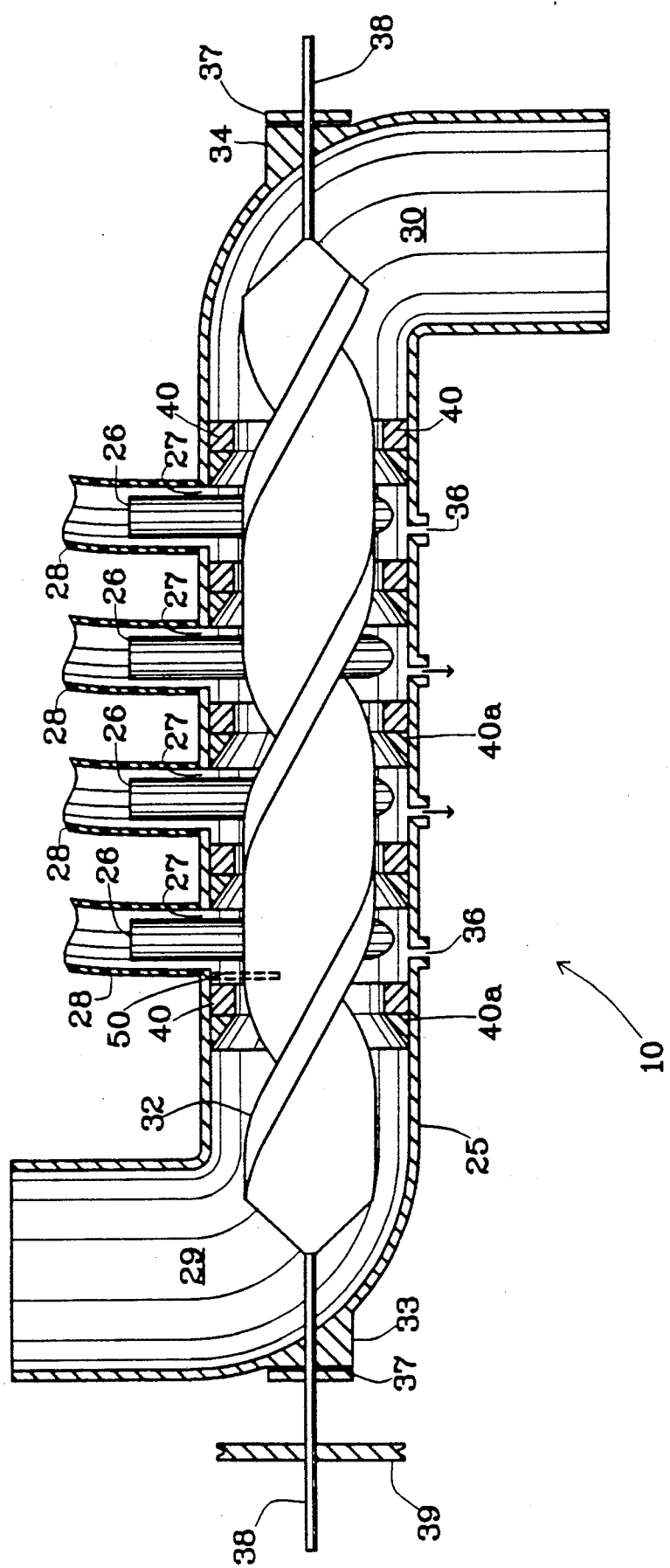
FIG. 3 is a side elevation view in section, showing the interior of the extractor device.

As seen in FIG. 3, in order to move the mash through the housing 25, a screw feed mechanism 32 is included, supported by bearings 33 and 34 located at elbows 29 and 30, respectively. The screw feed mechanism 32 rotates around its longitudinal axis thereby allowing its curved surface to force mash through the interior of the housing 25. It also acts to stir or redistribute the mash so as to allow more complete electrolysis of the material. Magnets 40 may be included between electrodes as discussed further below. Because the media is saturated with ammonium hydroxide, drainage outlets 36 are provided between adjacent magnets to allow the excess ammonium hydroxide to drain from the extractor device 10. The magnets 40 act as barriers for collecting liquid to be drained. Ramps 40a may be included, as shown in FIG. 3, to assure smooth flow of mash over the magnets. Alternatively the magnets can be shaped with a slope as shown on the ramps 40a. The ammonium hydroxide may be reused, depending on its pH level. The exit elbow 30 fits over the exit end of the housing in a downturned position as shown. This allows the residue to exit freely from the extractor device 10.

Lock rings 37 are fastened to the ends of shaft extensions 38 of the screw feed mechanism, to secure the screw 32 in position. This arrangement may also hold the elbows together with the housing 25, although a suitable form of clip is preferred for retaining the elbow to the housing. This allows the extractor device 10 to be easily disassembled for cleaning and repairs, by first removing the lock ring 37 at the exit end of the device. The lock ring at the intake end of the housing normally will not be removed because a rotation pulley 39 is locked onto the end of the shaft 38 just beyond the lock ring. This rotation pulley enables the screw feed mechanism 32 to be motor driven in the appropriate direction and at an appropriate rate of speed, so as to advance the mash smoothly through the device, from left to right as seen in FIG. 3.

As mentioned above, magnets 40 are positioned between adjacent electrodes 26, with the north polar face of each magnet directed toward the south polar face of each succeeding magnet. This arrangement provides a N, S, N, S sequence along the length of the housing chamber. Each magnet is secured in an orthogonal position relative to the electrodes. As disclosed in Hasebe U.S. Pat. No. 4,747,925, which is incorporated herein by reference, the magnetic force allows the weaker hydrogen molecules, which form on top of the medium, to form smaller bubbles which are able to escape the electrodes quickly thereby providing a more constant flow of hydrogen. The hydrogen molecules flow freely upward through the collector tubes 28 to the scrubber 4, where they are pumped into the hydrogen storage tank 8, as discussed in reference to FIG. 1.

Figure 4:
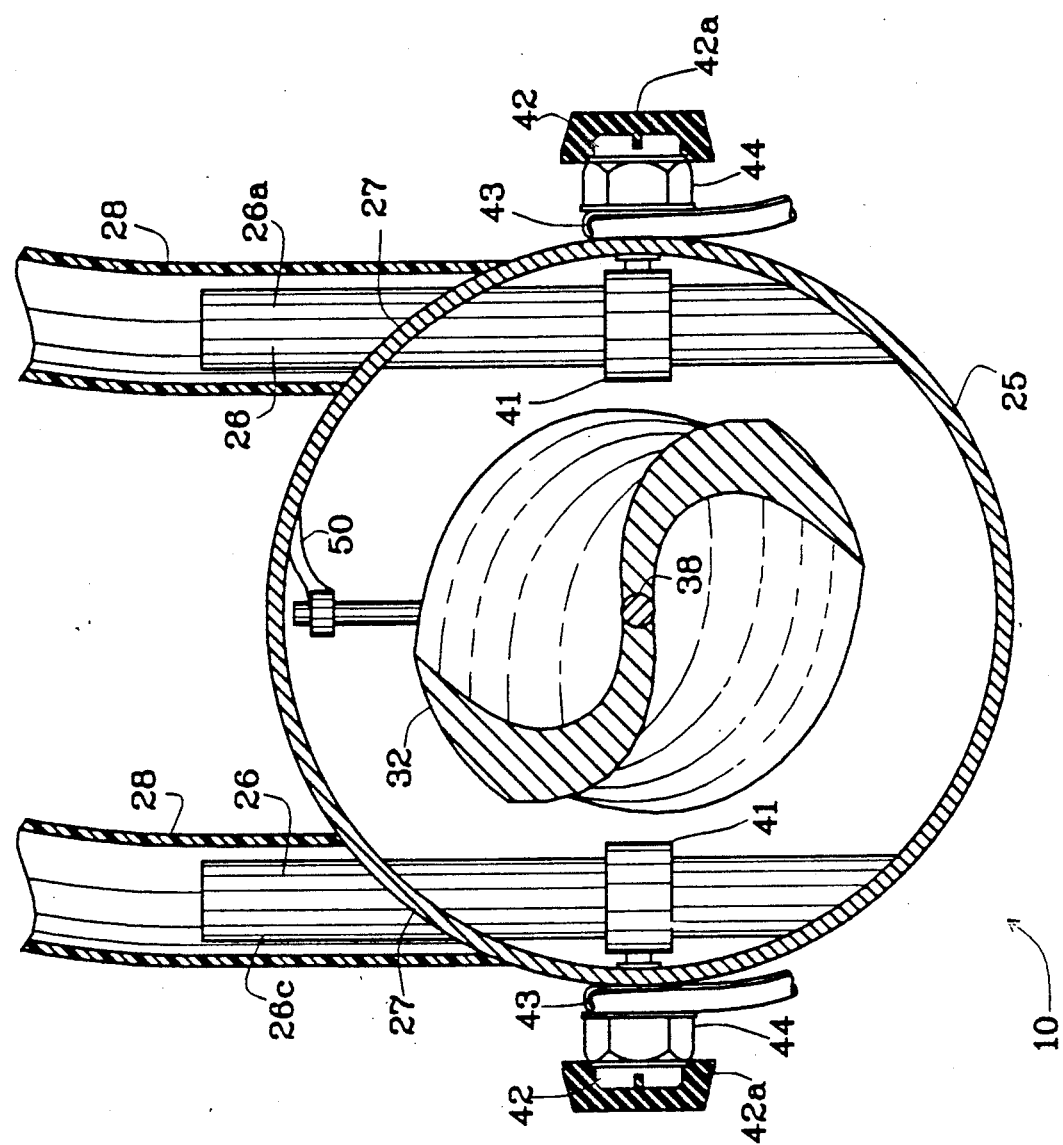
FIG. 4 is a transverse cross-sectional representation of the extractor device.

As seen in FIG. 4, each electrode 26 is connected to a conductive wire 43 via an anchor ring or screw 41 and a screw 42 (protected by an insulator 42a) with a tightened-down hex nut 44. The conductive wire 43 (see also FIG. 2) leads to a source of electric potential and current. The source may be an electronic pulsating device P (FIG. 2) located outside the housing for pulsating a DC voltage supplied to the electrodes 26. As disclosed in Timewell U.S. Pat. No. 4,795,537, which is incorporated herein by reference, the electronic pulsating device can be used in electrolysis to provide electrode conditioning. Electrode conditioning prevents the buildup of unwanted substances such as carbon on the electrodes due to ionic attraction. This buildup may interfere with the operation of the electrodes and require higher voltages for electrolysis to occur at an efficient rate. The electronic pulsating device efficiently prevents carbon buildup on the electrodes, thereby allowing lower voltages to be maintained. Minimum voltage levels are important because the ammonium hydroxide in the mash may begin to boil at higher voltages. If this occurs, the ammonium hydroxide will lose its effectiveness and the hydrogen transfer will be much less efficient.

FIG. 4 also shows a wiper device 50 which may be included to further assure that process mash flows properly through the extractor housing 25. Such wiper devices can be included just upstream of each electrode 26, so as to wipe mash from the interior wall of the housing between the magnets and the electrodes. An angles blade of the wiper is oriented to pull material away from the wall while also pushing it forward (downstream), thus assuring proper movement. The wiper devices 50 thus act to some extent in concert with the ramps 40a in assuring proper flow of process mash and eliminating stagnation at various points in the path of travel.

As indicated in FIG. 4, each wiper device 50 is connected to the screw feed device 32, and this may be by welding or other suitable attachment, near the outer periphery of the screw feed 32. The screw feed mechanism, as also shown in FIG. 4, occupies as large a diameter of the housing interior as possible, extending as closely as possible to the electrodes 26 and to the magnets 40 without contacting them. It should be understood that if the wiper devices 50 are included, the housing cannot be assembled by axial insertion of the screw feed mechanism 32. Instead, the housing in this embodiment is formed of assembled half-cylinders (not shown).

Due to the action of the pulsating device, the carbon will remain mixed with the decomposed remnants containing various chemical elements and compounds not affected by the electrolysis activity. These remnants will be moved through the device until they are expelled at the exit end of the housing.

The extractor device 10 produces a considerable volume of oxygen during electrolysis. Oxygen flows to the positive electrodes and is evacuated through the electrode openings 27 at the top of the housing 25. Oxygen gas bubbles can be collected and stored in the oxygen storage tank 11 discussed in connection with FIG. 1.

As seen in FIG. 4, the electrodes 26 are secured to the housing via anchor rings 41 that may be located near the bottom of the housing, or about midway in height as shown. Each electrode 26 extends through an opening 27 (FIG. 3) located near the top of the housing. Screws 42 attached to connective wire 43 pass through the housing 25 and into each anchor ring 41. The screws securely hold the anchor ring 41 and the electrodes 26 in place while providing an electrically conductive path to the electrodes. This arrangement allows the electrodes 26 to easily be removed for cleaning or replacement whenever the need arises. Insulators 42a fit over the extending heads of the screws 42, as shown, to safeguard against unwanted contact or grounding of the conductors.

The above described preferred embodiments are intended to illustrate the principles of the invention, but not to limit its scope. Other embodiments and variations to these preferred embodiments will be apparent to those skilled in the art and may be made without departing from the spirit and scope of the invention as defined in the following claims.

I claim:

1. An apparatus for electrolysis of organic, cellulose-containing material, comprising,
   a generally tubular housing having a generally horizontal axis,
   a series of cathodes extending through the housing at one side and exposed at an interior chamber defined in the housing, said cathodes being spaced apart along one side of the chamber in the housing,
   a series of anodes in opposition to the cathodes, on an opposite side of the chamber of the housing and extending through the housing similarly to the cathodes,
   material feed means connected to the housing, for continuously advancing a mash of organic cellulose-containing material in a continuously moving generally horizontal path through the housing chamber,
   means for introducing ammonium hydroxide to the mash of organic cellulose-containing material prior to introduction of the mash by the material feed means,
   and gas withdrawing means adjacent to the cathodes and sealed to the housing, providing conduits for withdrawal of hydrogen gas at each of the cathodes.

2. The apparatus according to claim 1, further including anode gas withdrawing means adjacent to each of the anodes and sealed to the housing, for withdrawing gas collected at the anodes.

3. The apparatus according to claim 1, wherein the gas withdrawing means comprises a series of tubes generally concentric with the cathodes extending through said one side of the housing, sealed to the housing such that gas collected at each of the cathodes can travel upwardly through the tube generally concentrically around the cathode so as to be withdrawn from the housing.

4. The apparatus according to claim 1, wherein the material feed means comprises a screw feed device positioned generally coaxially within the chamber defined in the housing, with means for rotating the screw feed device to advance the material generally axially through the chamber at a controlled rate of movement.

5. The apparatus of claim 4, wherein the housing and chamber are generally cylindrical, wherein the screw feed device is smaller in diameter than the inside of the chamber, and further including chamber wall wiping means for wiping material off the chamber wall between electrodes and pulling the material inward from the chamber wall and pushing the material forward in its path through the housing chamber.

6. The apparatus according to claim 5, wherein the material feed means comprises a screw feed device positioned generally coaxially within the chamber defined in the housing, with means for rotating the screw feed device to advance the material generally axially through the chamber at a controlled rate of movement and wherein the chamber wall wiping means comprises a wiper device secured to the screw feed device and extending generally radially therefrom to rotate with the screw feed device.

* * * * *